May 6, 1958　　　D. A. PALMITER　　　2,833,557
CONTROL DEVICE FOR TRACTOR-TRAILER COMBINATION
Filed Sept. 20, 1954　　　　　　　　　　　2 Sheets-Sheet 1

Daniel A. Palmiter
INVENTOR.
By His Attorneys.
Harris, Kiech, Foster & Harris.

May 6, 1958  D. A. PALMITER  2,833,557
CONTROL DEVICE FOR TRACTOR-TRAILER COMBINATION
Filed Sept. 20, 1954  2 Sheets-Sheet 2

INVENTOR.
DANIEL A. PALMITER

By His Attorneys.
HARRIS, KIECH, FOSTER & HARRIS.

United States Patent Office 2,833,557
Patented May 6, 1958

2,833,557

CONTROL DEVICE FOR TRACTOR-TRAILER COMBINATION

Daniel A. Palmiter, Alhambra, Calif., assignor to Shepherd Tractor & Equipment Co., Los Angeles, Calif., a limited partnership Application September 20, 1954, Serial No. 457,269

2 Claims. (Cl. 280—432)

This invention relates to a hydraulic control device which is designed to be used in governing the relative movement between a tractor and a trailer. More specifically, the device is designed to be employed with a tractor and a trailer such as are commonly used in the movement of large quantities of earth as a slave-type unit intended to supplement the existing steering means employed with such a tractor and scraper. A general object of the invention is to provide a hydraulic control of the category indicated which serves to stabilize the direct movement of a tractor and a trailer so as to enable such vehicles to be utilized without jack-knifing or other related difficulties.

This invention may be briefly summarized as embodying hydraulic cylinder or ram means mounted between a tractor and a trailer, and a hydraulic circuit as will be more fully described later, including various valve means, which hydraulic circuit is connected to the hydraulic cylinder or ram means in such a manner as to permit flow of fluid to such cylinder or ram means as the tractor and trailer are being turned with respect to one another, and is capable of blocking the flow of fluid to or from such hydraulic cylinder or ram means in order to form what may be termed a "hydraulic block" locking the tractor and the trailer in a given position with respect to one another, in order to maintain the progress of the tractor and trailer in any selected direction. The specific means of the invention are not intended to replace conventional steering means, but rather are intended to supplement such existing equipment in order to increase the utility of the apparatus upon which a hydraulic control device of the instant invention is employed.

Figure 1:
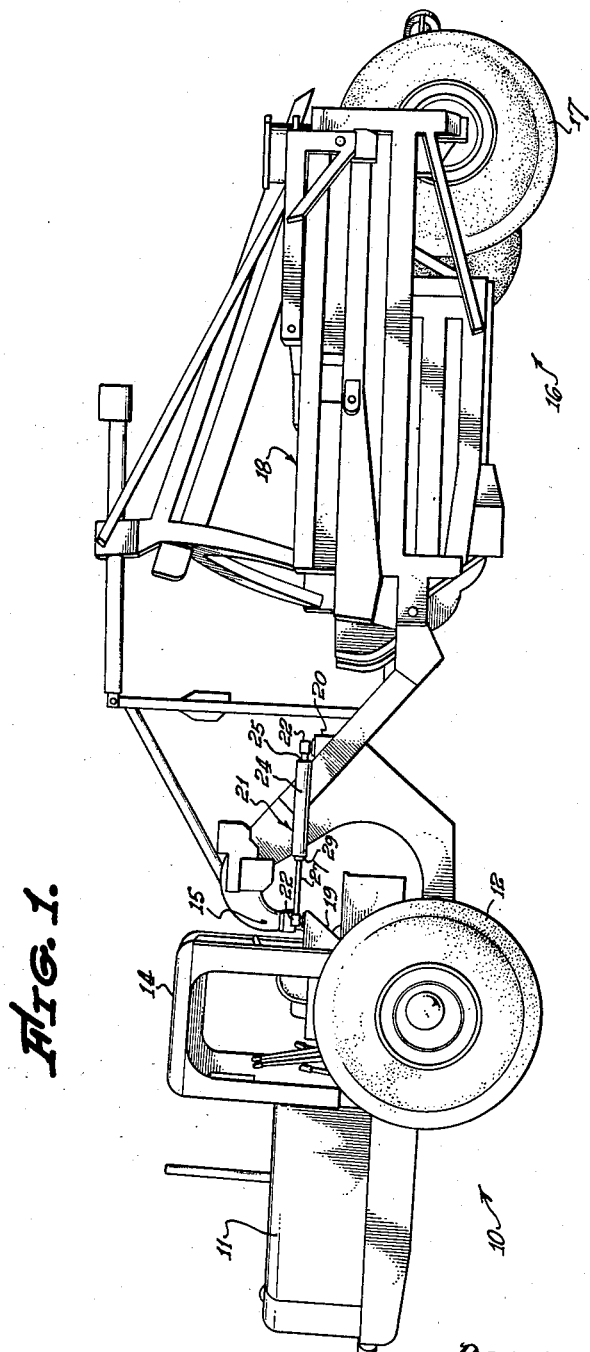
Figure 2:
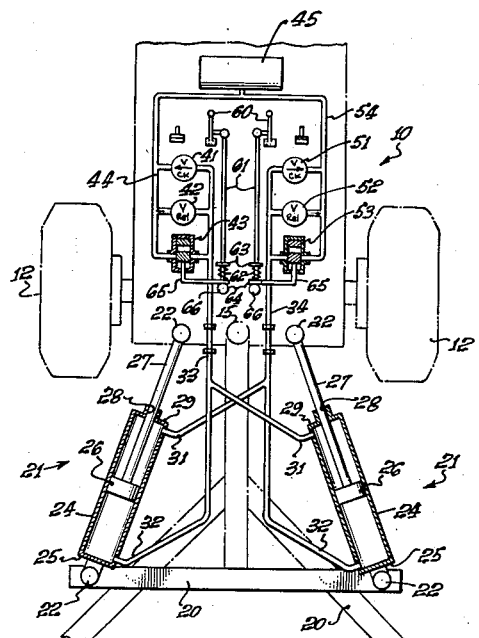
Figure 3:
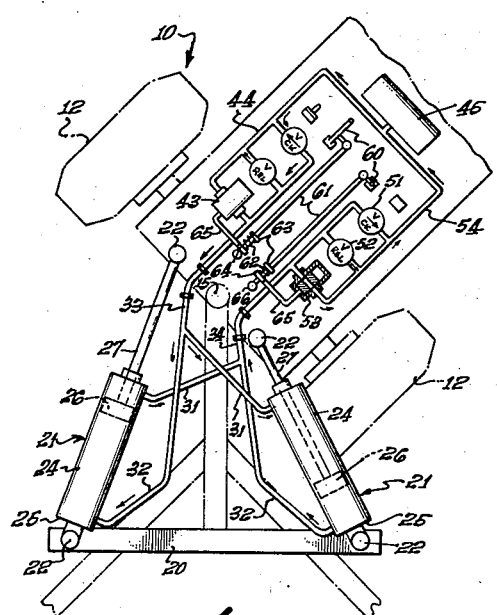
Figure 4:
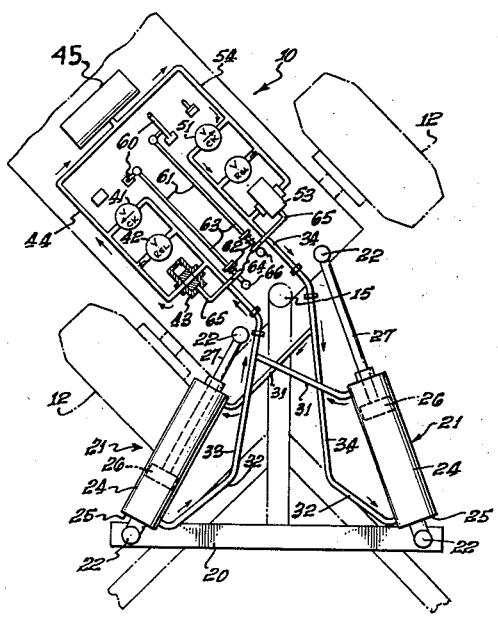

The invention is, of course, more specifically defined by the claims forming a part of the following specification. Further details of the invention will be apparent from the remainder of this specification and the accompanying drawings, in which:

Fig. 1 is a side view of a tractor and a scraper, a specific variety of a trailer, employing a steering device of the present invention; and Figs. 2, 3 and 4 are diagrammatic views illustrating the operation and construction of this steering device.

In Fig. 1, there is shown a tractor 10 of essentially conventional construction including a motor 11, tires 12, a cab 14 to which there is attached by means of a pivotal mounting 15 a scraper 16 having rear wheels 17, and a compartment 18 which is designed to be used in carrying dirt. Between the rear portion 19 of the tractor 10 and a brace 20 upon the scraper 16, there are mounted hydraulic cylinders 21 by means of swivel or universal type mountings 22 which are designed to at all times hold appropriate portions of the cylinders 21, as will be more fully explained, regardless of the relative positions of the tractor 10 and the scraper 16.

The precise construction of the hydraulic cylinders 21 is best illustrated in Figs. 2, 3 and 4 of the drawings. Each of these cylinders includes a generally cylindrical casing 24 having an end 25 which is connected by means of a swivel connection 22 to the brace 20. Disposed within each of the cylindrical casings 24 is a double-acting hydraulic piston 26 to which there is attached a connecting rod 27 projecting out through an opening 28 within an end 29 of the cylindrical casing 24 remote from the end 25. Each of the connecting rods 27 is connected by means of a swivel connector 22 to the tractor 10, as previously indicated.

Each of the cylindrical casings 24 is provided with pipes 31 and 32 which are designed for use in placing hydraulic fluid within and removing hydraulic fluid from opposite sides of the piston 26 in the casing 24, as will be more fully described. As is apparent from Fig. 2 of the drawings, the pipe 31 on one of the cylinders 21 is connected to a pipe 33 which also connects to a pipe 32 of the other of the hydraulic cylinders 21. Similarly, the other of the pipes 31 is connected to a pipe 34 which also connects to the other of the pipes 32. Thus, with this specific construction, the end of one of the cylinders 21 adjacent the tractor 10 is in fluid communication with the end of the other of the cylinders 21 remote from the tractor 10. A similar situation exists with respect to the end of the other of the cylinders 21 adjacent the tractor 10 and the other end of the other of the hydraulic cylinders 21.

As is apparent from an examination of Fig. 2 of the drawings, the pipe 33 is connected in parallel with a check valve 41, a pressure relief valve 42, and a flow-control valve 43. All three valves are connected by means of another pipe 44 to a tank 45 which serves as a suitable reservoir of hydraulic fluid. This tank 45 is placed above all of the other elements of the hydraulic system herein indicated in order that liquid will flow from it by the action of gravity. The pipe 34 is also connected in parallel with a check valve 51, a pressure-relief valve 52, and a flow-control valve 53, all three of which are connected by means of a pipe 54 to the reservoir 45 and the pipe 44. The tank or reservoir is at least partially filled with hydraulic fluid so that the pipes and cylinders connected thereto will be wholly filled with the hydraulic fluid.

The use of the steering device of the invention is comparatively simple. When the tractor 10 and the scraper 16 are being moved in a straight line, the valves 43 and 53 are closed, as indicated in Fig. 2, locking the hydraulic fluid within the cylinders 21 in such a manner as to prevent relative motion between the tractor and the scraper 16. In case of slight misalignment between the tractor 10 and the scraper 16 due to uneven ground, etc., equipment breakage is prevented by the escape of hydraulic fluid through either of the pressure-relief valves 42 and 52. Hydraulic fluid also flows into the cylinders 21 through either the check valve 41 or the check valve 51 in case of such misalignment.

When the tractor 10 and the scraper 16 are to be turned to the right, the valve 53 is opened, as indicated in Fig. 3 of the drawings, by means of a handle 60 being pulled backwards, actuating a rod 61 so as to move a spring 62 mounted between a collar 63 on this rod 61 and an eye 64 surrounding this rod 61. The eye 64 is connected by means of a lever 65 with the valve 53, and as pressure is exerted upon this eye 64, the lever 65 is moved, opening the valve 53. Upon the end of the rod 61, there is positioned a ball 66 which serves to prevent the eye 64 from moving off the rod 61 when the handle 60 is pushed to its initial position in closing the valve 53. This mechanism for opening the valve 53 is particularly advantageous with the invention because it prevents damage to the valve 53 in the event the handle 60 is moved too great a distance. Any other common overriding spring construction can be employed instead of the specific construction shown. The valve 53 can be opened or closed by any conventional means such as a screw handle, although this is not generally considered desirable.

When the valve 53 is opened, hydraulic fluid enters the pipe 34 through the attached pipes 31 and 32 by virtue of movement of the pistons 26 within the hydraulic cylinders 21 and moves through this valve 53, through the pipe 54, through the pipe 44, through the check valve 41, into the pipe 33, and thence into the attached pipes 31 and 32 and the hydraulic cylinders 21. From a consideration of this flow as illustrated by means of the arrows shown in Fig. 3, it is seen that hydraulic fluid is removed from the end of the hydraulic cylinder 21 adjacent the scraper 16 on the side of the scraper towards which the tractor 10 is being turned, and is also removed from the end of the other of the hydraulic cylinders 21 adjacent the tractor 10. A compensating amount of hydraulic fluid is introduced into the other extremities of the hydraulic cylinders 21 so as to at all times balance the pressure on the pistons 26 within these hydraulic cylinders. The actual movement of the hydraulic fluid in turning is a consequence of the pistons 26 being moved by the connecting rods 27 as the tractor 10 is moved with respect to the scraper 16 by conventional steering procedures.

When the tractor 10 and the scraper 16 are to be turned to the left, as indicated in Fig. 4 of the drawings, the valve 43 is opened. This valve 43 is actuated by the same type of lever construction described in detail in connection with Fig. 3 of the drawings. Because the details of these constructions are identical, this lever arrangement is not specifically described. When the valve 43 is opened, hydraulic fluid travels into the pipe 33 from the pipes 31 and 32 attached to the hydraulic cylinders 21, and thence travels through the pipe 44, the pipe 54 and the check valve 51 into the pipe 34, the attached pipes 31 and 32, and into the ends of the hydraulic cylinders 21 connected to these latter pipes.

With the specific construction illustrated, it is possible to close the valves 43 or 53 at any point during the turning of the tractor 10 and the scraper 16 so as to effectively lock the tractor 10 and the scraper 16 with respect to one another in the same manner as shown in Fig. 2 of the drawings. When this is done, the unit functions in the expected manner, turning about a given pivot point. Any misalignment of the tractor 10 and the scraper 16 caused by uneven ground, etc., is compensated by means of the pressure-relief valves 42 and 52 and the check valves 41 and 51, as previously described.

It will be realized by those skilled in the art that with tractors employed in constructions such as are illustrated, the tires 12 of the tractor are connected directly to clutches and thence to the motor of the tractor 10 and that steering is accomplished by disengaging the respective clutch on the side of the vehicle toward which it is desired to turn. If more rapid turning is desired, it can be obtained by engaging the brake on the same side. The instant invention has been found in experience to operate most efficiently when the valve 43 or 53 is opened in turning after the clutch has been disengaged, but before the brake has been engaged.

When the tractor 10 and the scraper 16 are going downhill, the momentum of the entire apparatus and the load within this apparatus, if it is loaded, is such that the reverse of the steering procedure indicated above must be employed. Since frequently, in going downhill, both brakes upon a tractor are actuated, both of the valves 43 and 53 may be and opened, and the hydraulic cylinders 21 merely exercise a snubbing or a shock-absorbing type of action. It is possible, however, to have these valves 43 and 53 connected so as to be closed during downhill travel in order to lock the tractor 10 and the scraper 16 with respect to one another.

The herein described invention has proved itself to be quite satisfactory from a commercial standpoint, and, when used with a standard tractor and scraper combination of widely known make, has enabled this tractor and scraper combination to be utilized in situations where it could not previously be satisfactorily employed. It has also materially reduced the danger for operators of this equipment.

It is seen from a consideration of the preferred use of the hydraulic control device of the instant invention, as described above, that a number of modifications may be made within this hydraulic control device without departing from the essential teachings of this specification. An important feature of the invention is the fact that the hydraulic cylinder means employed can be utilized as a slave-type directional control unit in which fluid is either introduced into or removed from the hydraulic cylinder means by the opening of given valves as a tractor and trailer are turned by conventional steering. Then, when the tractor and trailer are in any desired position with respect to another, such valve means can be closed so as to form a hydraulic block which is capable of maintaining the vehicles at a given angle with respect to one another so as to maintain progress in such a selected direction. With this construction, there is on danger of breakage or the like resulting from movement of the tractor and trailer over uneven ground or other "difficult" terrain. Those skilled in the art will further realize that a number of other modifications may be made within the scope of the instant disclosure. Such modifications are to be considered as part of this invention insofar as they are within the skill of the art and are within the scope of the appended claims.

I claim as my invention:

1. In a hydraulic mechanism for controlling the angular relation between a steerable tractor vehicle and a trailer vehicle, the combination of: a first hydraulic cylinder having a first piston therein, said first piston defining rod and clear chambers in said first cylinder, said first piston being pivotally connected to one of said vehicles and said first cylinder being pivotally connected to the other of said vehicles; a second hydraulic cylinder having a second piston therein, said second piston defining rod and clear chambers in said second cylinder, said second piston being pivotally connected to one of said vehicles and said second cylinder being pivotally connected to the other of said vehicles; a first normally closed valve having an inlet and an outlet; a second normally closed valve having an inlet and an outlet; a first fluid conduit directly interconnecting said inlet of said first valve, said rod chamber of said first cylinder and said clear chamber of said second cylinder; a second fluid conduit directly interconnecting said inlet of said second valve, said rod chamber of said second cylinder and said clear chamber of said first cylinder; a third fluid conduit directly interconnecting said outlets of said first and second valves, said first, second and third conduits and said rod and clear chambers of each of said cylinders being filled with a hydraulic fluid; a first check valve for fluid flow only from said third conduit to said first conduit; a second check valve for fluid flow only from said third conduit to said second conduit; first control means for opening said first valve; and second control means for opening said second valve, said first and second control means being operable independently of each other.

2. In a hydraulic mechanism for controlling the angular relation between a steerable tractor vehicle and a trailer vehicle, the combination of: a first hydraulic cylinder having a first piston therein, said first piston defining rod and clear chambers in said first cylinder said first piston being pivotally connected to one of said vehicles and said first cylinder being pivotally connected to the other of said vehicles; a second hydraulic cylinder having a second piston therein, said second piston defining rod and clear chambers in said second cylinder, said second piston being pivotally connected to one of said vehicles and said second cylinder being pivotally connected to the other of said vehicles; a first normally closed valve having an inlet and an outlet; a second normally closed valve having an inlet and an outlet; a first fluid conduit directly interconnecting said inlet of said first valve, said rod chamber of said first cylinder and said clear chamber of said second cylinder; a second fluid conduit directly interconnecting said inlet of said second valve, said rod chamber of said second cylinder and said clear chamber of said first cylinder; a third fluid conduit directly interconnecting said outlets of said first and second valves, said first, second and third conduits and said rod and clear chambers of each of said cylinders being filled with a hydraulic fluid; a first check valve for fluid flow only from said third conduit to said first conduit; a second check valve for fluid flow only from said third conduit to said second conduit; a first relief valve for fluid flow only from said first conduit to said third conduit when the fluid pressure in said first conduit exceeds a predetermined magnitude; a second relief valve for fluid flow only from said second conduit to said third conduit when the fluid pressure in said second conduit exceeds a predetermined magnitude; first control means for opening said first valve; and second control means for opening said second valve, said first and second control means being operable independently of each other.

References Cited in the file of this patent
UNITED STATES PATENTS

| | | |
|---|---|---|
| 2,278,081 | Kramer | Mar. 31, 1942 |
| 2,360,902 | Simmons | Oct. 24, 1944 |
| 2,362,262 | French | Nov. 7, 1944 |
| 2,368,202 | Clark | Jan. 30, 1945 |
| 2,557,066 | Armington | June 19, 1951 |
| 2,565,285 | Wakeman | Aug. 21, 1951 |
| 2,614,644 | Gustafson | Oct. 21, 1952 |
| 2,638,998 | Rockwell | May 19, 1953 |
| 2,709,088 | Orbits | May 24, 1955 |

UNITED STATES PATENT OFFICE

CERTIFICATE OF CORRECTION

Patent No. 2,833,557            May 6, 1958

Daniel A. Palmiter

It is hereby certified that error appears in the printed specification of the above numbered patent requiring correction and that the said Letters Patent should read as corrected below.

Column 3, line 10, for "cyliders" read -- cylinder --; line 70, before "opened" strike out "and"; line 73, for "values 43" read -- valves 43 --; column 4, line 21, before "another" insert -- one --; line 25, for "there is on" read -- there is no --.

Signed and sealed this 22nd day of July 1958.

(SEAL)

Attest:

KARL H. AXLINE

Attesting Officer

ROBERT C. WATSON
Commissioner of Patents